United States Patent
Shiiba et al.

(10) Patent No.: US 7,739,490 B2
(45) Date of Patent: Jun. 15, 2010

(54) CONTROL APPARATUS, UPGRADE METHOD AND PROGRAM PRODUCT OF THE SAME

(75) Inventors: Eiji Shiiba, Tokyo (JP); Masanao Amimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 887 days.

(21) Appl. No.: 11/524,209

(22) Filed: Sep. 21, 2006

(65) Prior Publication Data

US 2007/0074015 A1 Mar. 29, 2007

(30) Foreign Application Priority Data

Sep. 29, 2005 (JP) ............... 2005-283391

(51) Int. Cl.
*G06F 15/177* (2006.01)
(52) U.S. Cl. .................. 713/2; 713/1; 713/100
(58) Field of Classification Search ........ 713/1, 713/2, 100
See application file for complete search history.

(56) References Cited

U.S. PATENT DOCUMENTS

2001/0056532 A1* 12/2001 Cooper .......... 713/2
2005/0060528 A1* 3/2005 Kim .............. 713/1
2005/0114852 A1* 5/2005 Chen et al. ........ 717/168
2006/0075395 A1* 4/2006 Lee et al. ......... 717/168

FOREIGN PATENT DOCUMENTS

JP 5-158703 6/1993
JP 2001-117780 4/2001

* cited by examiner

*Primary Examiner*—Dennis M Butler
(74) *Attorney, Agent, or Firm*—Young & Thompson

(57) ABSTRACT

A control device ensures system booting without delay or failure even if the system cannot be booted using newly downloaded upgraded software. Nonvolatile storage 14 stores booting software used for system booting at the time of system power on or reset, and booting software information which designates the booting software. At the time of booting software upgrade, download unit 12 downloads the upgraded version of the booting software and stores it in nonvolatile storage 14. Booting unit 13 boots the system using the upgraded software if the data thereof is normal, otherwise boots the system using the booting software.

16 Claims, 7 Drawing Sheets

Fig. 4

151J UPGRADED SOFTWARE INFORMATION

- FILE NAME OF THE UPGRADED SOFTWARE FILE ~ 401
- UPGRADED SOFTWARE BOOTING FLAG (ON OR OFF) ~ 402

Fig. 5

152J BOOTING SOFTWARE INFORMATION

- FILE NAME OF THE BOOTING SOFTWARE FILE ~ 501

Fig. 6

161J AUXILIARY UPGRADED SOFTWARE INFORMATION

- FILE NAME OF THE AUXILIARY UPGRADED SOFTWARE FILE ~ 601
- UPGRADED SOFTWARE BOOTING FLAG (ON OR OFF) ~ 602

Fig. 7

162J AUXILIARY BOOTING SOFTWARE INFORMATION

- FILE NAME OF THE AUXILIARY BOOTING SOFTWARE FILE ~ 701

CONTROL APPARATUS, UPGRADE METHOD AND PROGRAM PRODUCT OF THE SAME

FIELD OF THE INVENTION

The invention relates to technology to upgrade the software used for system booting of a control apparatus. Particularly, the invention relates to technology to avoid system booting failure even if the upgrade failed.

BACKGROUND OF THE INVENTION

Conventionally, for upgrading software used in a control apparatus, new version of the software is downloaded from a management apparatus via network.

When the software to be upgraded is an application program such as software for spreadsheets or word processor, system booting failure will not occur even if write error or power failure occurs and the upgrade fails. However, in the case that the software to be upgraded is a kind of basic software which is involved in system booting, should abnormality occur during download or update, system booting failure may occur.

Therefore, various technologies have been suggested in order to avoid system booting failure even if any abnormality occurs during downloading and upgrade fails (e.g., see JP 2001-117780 and JP 5-158703).

The prior art control unit disclosed in JP '780 includes a first and a second flash PROMs, one of which stores software used for current system booting. The system also includes a manual switch which can assume a first and second statuses, and a switching unit to assign one of the first and second flash PROMs to a predefined address space for read/write software, based on the status of the manual switch and a upgrade signal indicating whether upgrade is currently carried out or not (level "1" at the time of upgrade, otherwise, level "0"), to enable read and write the software. In the case that the manual switch is in the first status, the switching unit assigns the first flash PROM to the predefined address space if the upgrade signal is at level "0", and the switching unit assigns the second flash PROM to the predefined address space if the upgrade signal is at level "1". In another case that the manual switch is in the second status, the switching unit assigns the second flash PROM to the predefined address space if the upgrade signal is at level "0", and the switching unit assigns the first flash PROM to the predefined address space if the upgrade signal is at level "1".

In a prior art control unit having above structure, software is upgraded as follows. Suppose that the first flash PROM stores software currently used for system booting, and the manual switch is in the first status. When the software stored in the first flash PROM is to be upgraded, the version up signal is changed to "1" to download the upgraded software. In this case, since the manual switch is in the first status and the upgrade signal is "1", the second flash PROM is addressed to predefined address space and the upgraded software is downloaded and written in the second flash PROM. After upgrade is completed, the upgrade signal is changed to "0" and the predefined address space is assigned to the first flash PROM.

The prior art control apparatus disclosed in JP '703 includes EEPROM for current use and auxiliary EEPROM, and EEPROM for current use stores the software currently used for system booting. The control unit further includes a toggle-type register which can assume two statuses, that is, ON/OFF to indicate whether the system is booted using EEPROM for current use or auxiliary EEPROM on reset. When the toggle-type register is ON, EEPROM for current use is used for system booting, and when the toggle-type register is OFF, auxiliary EEPROM is used for system booting.

In the prior art control unit having a structure as above, software is upgraded as follows. Suppose that the toggle register is ON and the control unit is run by the software stored in EEPROM for current use. In this configuration, when the software stored in EEPROM for current use is to be upgraded, the upgraded software is transferred from the management apparatus to the control unit, and auxiliary EEPROM is designated as a place to store the transferred software. Thereby, the control unit writes the upgraded software transferred from the management apparatus to auxiliary EEPROM. Then, the control unit verifies whether the data in auxiliary EEPROM is normal or not according to an instruction from the management apparatus, and returns the verification result to the management apparatus. If the verification result indicates some problem, the management apparatus transfers the upgraded software again. Otherwise if no problem, the management apparatus toggles the toggle-type register to OFF and instructs the control unit to perform a reset. Thereby, the control unit will be reset and the boot program starts. In this case, since the toggle-type register is turned OFF, the control unit starts the system using the upgraded software stored in auxiliary EEPROM.

In the prior art technologies disclosed in JP '780 and JP '703, the upgraded software is downloaded to a storage device (flash PROM, EEPROM) other than that stores the software being currently used for system booting. Thus, when the upgrade fails, the system can be booted using the old version software stored in this storage device, so that system booting failure will not occur.

However, in view of the technologies disclosed in JP '780 or JP '703, it remains desirable to solve following problems.

According to the technology disclosed in JP '780, the user must toggle a manual switch to use the upgraded software after downloading. This method is inconvenient for users in operation. Particularly, in the technology disclosed in JP '780, when upgrading the software, the second flash PROM is designated as the predefined address space to read and write software, by the switching unit. After upgrading, the first flash PROM which stores the old version software is designated as the predefined address space by the switching unit. Therefore, in order to use the upgraded software, the user must toggle the manual switch to designate the second flash PROM to the predefined address space. This configuration is not convenient for users in operation.

On the other hand, according to the technology disclosed in JP '703, the upgraded software is downloaded to auxiliary EEPROM. Then, the system is reset, and booted using the upgraded software. This configuration does not have an inconvenience like the technology disclosed in '780 for users because the user does not have to operate the manual switch in order to use the upgraded software.

However, in the technology disclosed in JP '703, it may take a long time to boot the system because in the case if any problem is detected in the verification, the management apparatus downloads the data of the upgraded software again into auxiliary EEPROM. This process may take a long time and cause some delay to complete booting the system. Particularly, in the case that the size of the software to be upgraded is large, much time should be spent until start of system booting.

This causes problems such as operations using the control unit cannot be started in time, or interrupted for a long time.

SUMMARY OF THE INVENTION

In order to solve the above and other problems, the object of the present invention is to provide a system which can be booted with out delay regardless of whether the upgraded software (new version software) downloaded is normal or not. To achieve this object, the system can be booted using the upgraded software if the data of the upgraded software just downloaded is normal, otherwise using the old version software.

According to one embodiment of the invention, a first control apparatus includes, a nonvolatile storage that stores booting software used for system booting, and booting software information which designates the booting software; a download unit that downloads an upgraded version of the booting software to store the upgraded version of the booting software in the nonvolatile storage; and a booting unit that boots the system; wherein the booting unit is constructed so that on the first system reset after download of the upgraded software by the download unit, the booting unit checks the data of the upgraded software stored in the nonvolatile storage, and if the data of the upgraded software is normal then the booting unit boots the system using the upgraded software, otherwise if the data of the upgraded software is not normal then the booting unit boots the system using the booting software designated by the booting software information.

According to another embodiment of the invention, the control apparatus includes, a nonvolatile storage comprising a first partition and a second partition, wherein the first partition stores system booting software used for system booting, and booting software information designating the booting software, and the second partition stores auxiliary booting software used for system booting alternative to the system booting software; a download unit that downloads the upgraded version of the booting software and stores the upgraded version in the first partition; and a booting unit that boots the system; wherein the booting unit is constructed so that on the first system reset after download of the upgraded software by the download unit, the booting unit checks the data of the upgraded software, and if the data of the upgraded software is normal then the booting unit boots the system using the upgraded software, otherwise if the data of the upgraded software is not normal and the data of the booting software designated by the booting software information is normal then the booting unit boots the system using the booting software, otherwise if the data of the upgraded software is not normal and the data of the booting software designated by the booting software information is not normal and the data of the auxiliary booting software is normal then the booting unit boots the system using the auxiliary booting software.

According to another embodiment of the invention, a first upgrading method for a control apparatus comprising a nonvolatile storage that stores booting software used for system booting, and booting software information which designates the booting software, the method comprising: downloading an upgraded version of the booting software to store the upgraded version of the booting software in the nonvolatile storage; resetting the system; and booting the system; wherein on the first system reset after downloading, the data of the upgraded software stored in the nonvolatile storage is checked, and if the data of the upgraded software is normal then booting the system is performed using the upgraded software, otherwise if the data of the upgraded software is not normal then booting the system is performed using the booting software designated by the booting software information.

According to another embodiment of the invention, the upgrading method for a control apparatus comprising a nonvolatile storage comprising a first partition and a second partition, wherein the first partition stores system booting software used for system booting, and booting software information designating the booting software, and the second partition stores auxiliary booting software used for system booting alternative to the system booting software, the method comprising the steps of: downloading the upgraded version of the booting software to store the upgraded version of the booting software in the first partition; resetting the system; booting the system; wherein on the first system reset after downloading, the data of the upgraded software is checked, and if the data of the upgraded software is normal then booting the system is performed using the upgraded software, otherwise if the data of the upgraded software is not normal and the data of the booting software designated by the booting software information is normal then booting the system is performed using the booting software, otherwise booting the system is performed using the auxiliary booting software.

According to another embodiment of the invention, a first program product for a computer comprising a nonvolatile storage which stores booting software used for system booting, and booting software information which designates the booting software, makes the computer function as comprising: a download unit that downloads the upgraded version of the booting software to store the upgraded version of the booting software in the nonvolatile storage; and a booting unit that boots the system; wherein the booting unit is constructed so that on the first system reset after download of the upgraded software by the download unit, the booting unit checks the data of the upgraded software stored in the nonvolatile storage, and if the data of the upgraded software is normal then the booting unit boots the system using the upgraded software, otherwise if the data of the upgraded software is not normal then the booting unit boots the system using the booting software designated by the booting software information.

According to another embodiment of the invention, the program product for a computer comprising a nonvolatile storage comprising a first partition and a second partition, wherein the first partition stores system booting software used for system booting, and booting software information designating the booting software, and the second partition storing auxiliary booting software used for system booting alternative to the system booting software, makes the computer function as comprising: a download unit that downloads the upgraded version of the booting software to store the upgraded version of the booting software in the first partition; and a booting unit that boots the system; wherein the booting unit is constructed so that on the first system reset after download of the upgraded software by the download unit, the booting unit checks the data of the upgraded software, and if the data of the upgraded software is normal then the booting unit boots the system using the upgraded software, otherwise if the data of the upgraded software is not normal and the data of the booting software designated by the booting software information is normal then the booting unit boots the system using the booting software, otherwise if the data of the upgraded software is not normal and the data of the booting software designated by the booting software information is not normal and the data of the auxiliary booting software is normal then the booting unit boots the system using the auxiliary booting software.

According to another embodiment of the invention, a first storage medium having stored thereon instructions that can be read by a computer system, the computer system comprising a nonvolatile storage that stores booting software used for system booting, and booting software information which designates the booting software, the instructions causing the computer system to perform the steps comprising: downloading an upgraded version of the booting software to store the up graded version of the booting software in the nonvolatile storage; resetting the system; and booting the system; wherein on the first system reset after downloading, the data of the upgraded software stored in the nonvolatile storage is checked, and if the data of the upgraded software is normal then booting the system is performed using the upgraded software, otherwise if the data of the upgraded software is not normal then booting the system is performed using the booting software designated by the booting software information.

According to another embodiment of the invention, the storage medium having stored thereon instructions that can be read by a computer system, the computer system comprising a nonvolatile storage comprising a first partition and a second partition, wherein the first partition stores system booting software used for system booting, and booting software information designating the booting software, and the second partition stores auxiliary booting software used for system booting alternative to the system booting software, the instructions causing the computer system to perform the steps comprising: downloading the upgraded version of the booting software to store the upgraded version of the booting software in the first partition; resetting the system; booting the system; wherein on the first system reset after downloading, the data of the upgraded software is checked, and if the data of the upgraded software is normal then booting the system is performed using the upgraded software, otherwise if the data of the upgraded software is not normal and the data of the booting software designated by the booting software information is normal then booting the system is performed using the booting software, otherwise booting the system is performed using the auxiliary booting software.

BRIEF DESCRIPTION OF THE DRAWINGS

FIG. 4 is a drawing which shows exemplary contents of upgraded software information 151J.

FIG. 5 is a drawing which shows exemplary contents of booting software information 152J.

FIG. 6 is a drawing which shows exemplary contents of auxiliary upgraded software information 161J.

FIG. 7 is a drawing which shows exemplary contents of auxiliary booting software information 162J.

DESCRIPTION OF REFERENCE NUMERALS

Figure 1:
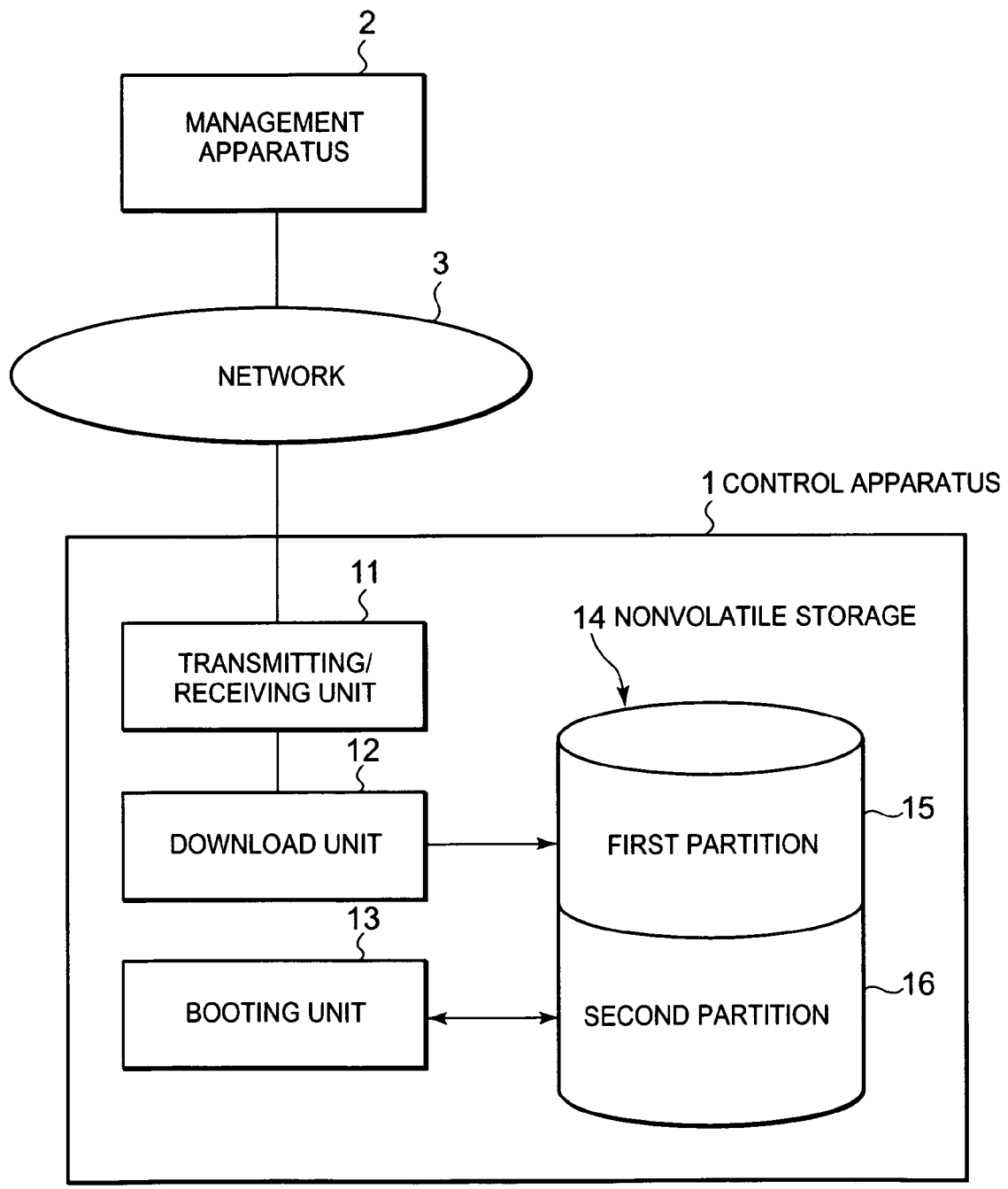
FIG. 1 is a block diagram which shows an exemplary structure of an embodiment according to the invention.

1 Control apparatus
11 Transmitting/receiving unit
12 Download unit
13 Booting unit
14 Nonvolatile storage
15 First partition
151 Upgraded software information file
152 Booting software information file
153 Upgraded software file
154 Booting software file
16 Second partition
161 Auxiliary upgraded software information file
162 Auxiliary booting software information file
163 Auxiliary upgraded software file
164 Auxiliary booting software file

DETAILED DESCRIPTION OF THE PREFERRED EMBODIMENT(S)

The nonvolatile storage stores booting software used for system booting on system power supply or reset, and booting software information designating the booting software. When the booting software is to be upgraded, the download unit downloads the upgraded booting software to store it in the nonvolatile storage. On the first system reset after download, the booting unit boots the system using the upgraded software if the data of the upgraded software stored in the nonvolatile storage is normal, otherwise boots the system using the booting software designated by the booting software information.

Next, embodiments of the invention will be described with reference to the accompanying drawings.

FIG. 1 is a block diagram which shows an exemplary structure of the embodiment of the invention. The embodiment includes control apparatus 1 of which software is to be upgraded, management apparatus 2 which remotely manages the control apparatus 1, and control apparatus 1 and management apparatus 2 are connected to each other via network 3 such as a LAN or the Internet.

Control apparatus 1 includes transmitting/receiving unit 11, download unit 12, booting unit 13, and nonvolatile storage 14 such as a magnetic disk device.

Nonvolatile storage 14 includes first partition 15 and second partition 16 as partitions of a file system configuring a redundant storage tolerant against troubles such as an electric power failure. In general, file systems are fragile in nature because some kinds of these troubles often break a file data writing procedure and consequently cause loss of logical relationships between each of stored file data. In this situation or the like, a written file may be recognized as invalid. A redundantly configured nonvolatile storage brings avoidance of fatal error because at least one partition stores correct file data as a consequence of a sequential manner in the file data writing procedure into two partitions. For example, a general file system called "file allocation table (FAT) system" has FAT region, directory region and data region in the storage media for storing file data. FAT region and directory region store the file managing information including the name, size, date and time, and location of data stored in the data region. The information stored in these regions has logical relationships with each other. On the basis of these logical relationships, data stored in these regions can be interpreted as a file, and the file can be handled as the file. When data is written into the file, the data will be written into these three regions in a sequential manner. If a power failure occurs during writing some data into the file, it breaks the writing procedure. Then, the relationship among data or information stored in these three regions may be lost and the file may be recognized as invalid. Sometimes the file system itself may be recognized as broken. In case of such a serious situation, however, with referring to the data stored in the redundant partition, namely, another partition in this embodiment, correct data can be obtained and interpreted as the file.

Figure 2:
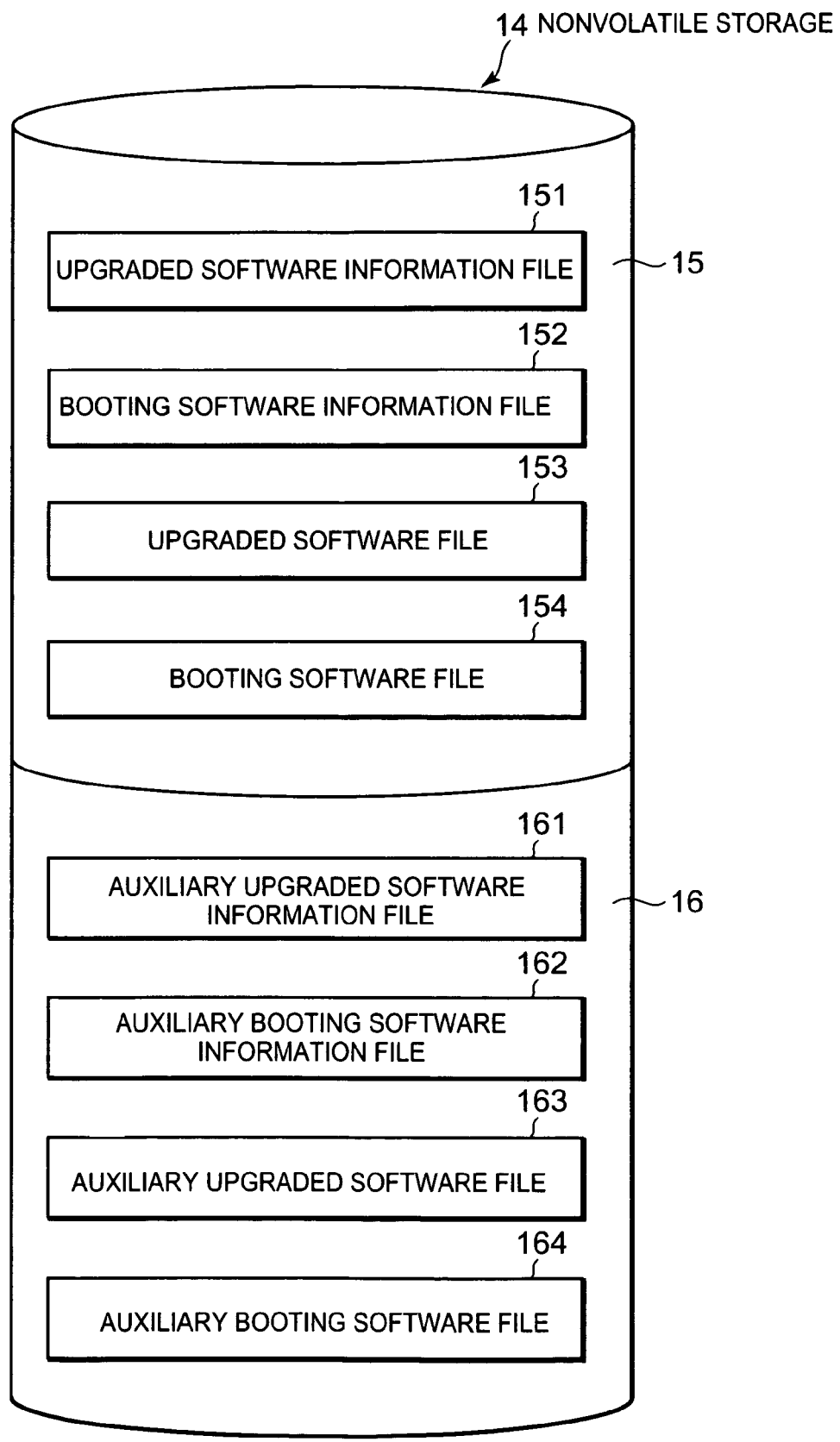
FIG. 2 is a drawing which shows an exemplary structure of nonvolatile storage 14.

Referring to FIG. 2, first partition 15 stores upgraded software information file 151, booting software information file 152, upgraded software file 153, and booting software file 154. Second partition 16 stores auxiliary upgraded software information file 161, auxiliary booting software information file 162, auxiliary upgraded software file 163, and auxiliary booting software file 164.

Figure 3:
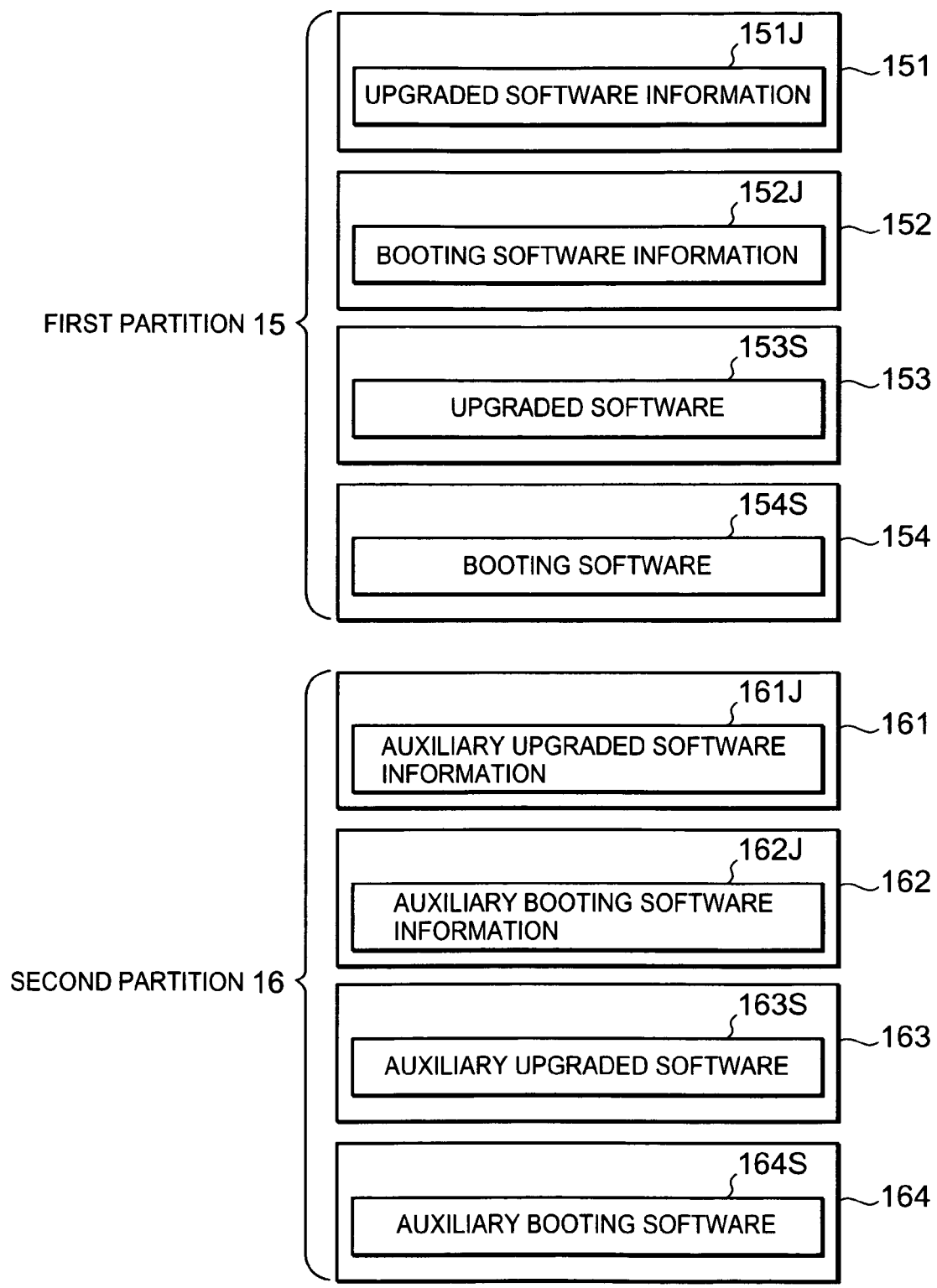
FIG. 3 is a drawing which shows exemplary contents of files stored in nonvolatile storage 14.

Referring to FIG. 3, files 151, 152, 153, and 154 of first partition 15 store upgraded software information 151J, booting software information 152J, upgraded software 153S, and booting software 154S, respectively. Upgraded software 153S stored in upgraded software file 153 is the upgraded version of booting software 154S stored in booting software file 154. Files 161, 162, 163, and 164 in second partition 16 store auxiliary upgraded software information 161J, auxiliary booting software information 162J, auxiliary upgraded software 163S, and auxiliary booting software 164S, respectively.

Upgraded software information 151J contains information on the latest upgraded software file 153 downloaded from management apparatus 2. Referring to FIG. 4, upgraded software information 151J includes file name 401 of upgraded software file 153 and upgraded software booting flag 402 which indicates if the upgraded software 153S stored in upgraded software file 153 is ready to boot (in this embodiment, ON indicates that the upgraded software 153S is ready, and OFF indicates not ready. In initial state, the flag is OFF). File name 401 of upgraded software file 153 is updated when download unit 12 downloads upgraded software file 153 from management apparatus 2. Upgraded software booting flag 402 is set ON when download unit 12 downloads upgraded software file 153 from management apparatus 2, and set OFF when booting unit 13 completes system booting using upgraded software 153S.

Booting software information 152J contains information on booting software file 154 which stores booting software 154S used for system booting on system power supply or reset. Referring to FIG. 5, booting software information 152J contains file name 501 of booting software file 154. This file name 501 is updated to the file name of upgraded software file 153 when booting unit 13 boots the system using upgraded software 153S. That is, after the system booting using upgraded software 153S completed, upgraded software file 153 and upgraded software 153S will be handled newly as a booting software file and booting software, while booting software file 154 and booting software 154S will not be used again.

Auxiliary software information 161J contains information on auxiliary software file 163 which stores auxiliary upgraded software 163S. Referring to FIG. 6, auxiliary upgraded software information 161J contains file name 601 of auxiliary upgraded software file 163 storing auxiliary upgraded software 163S, and upgraded software booting flag 602. In this embodiment, the initial value of upgraded software booting flag 602 is OFF.

Auxiliary booting software information 162J contains information on auxiliary software file 164 storing auxiliary booting software 164S. Referring to FIG. 7, auxiliary booting software information 162J contains file name 701 of auxiliary booting software file 164.

Auxiliary upgraded software 163S and auxiliary booting software 164S are alternatives to upgraded software 153S and booting software 154S respectively. The booting unit 13 determines which software to be used for booting the system.

In the initial state (as shipped from a factory), files 153, 154, 163, and 164 stored in the nonvolatile storage 14 contain identical software.

Transmitting/receiving unit 11 has a function to exchange data via network 3.

Download unit 12 is implemented by a download program. Download unit 12 has following functions; to download upgraded software file 153 containing latest upgraded software 153S from management apparatus 2 to store it in the first partition 15, to set a file name of downloaded upgraded software file 153 in file name 401 of upgraded software information 151J after downloading upgraded software file 153, and to turn ON upgraded software booting flag 402 to show that the upgraded software 153 is ready to boot.

Booting unit 13 is implemented by a boot program. Booting unit has a function to boot the system using software stored in nonvolatile storage 14 on system power supply or reset. Booting unit 13 selects the software to be used for system booting according to the following priority (a) to (d).

(a) If upgraded software booting flag 402 in upgraded software information 151J is ON and the data of upgraded software 153S in upgraded software file 153 designated by file name 401 is normal, booting unit 13 employs the upgraded software 153S to boot.

(b) Otherwise, if the data of booting software 154S in booting software file 154 designated by file name 501 in booting software information 152J is normal, booting unit 13 employs the booting software 154S to boot.

(c) Otherwise, if the upgraded software booting flag 602 in auxiliary upgraded software information 161J is ON and the data of auxiliary upgraded software 163S in auxiliary upgraded software file 163 designated by file name 601 is normal, booting unit 13 employs the auxiliary upgraded software 163S to boot.

(d) Otherwise, if the data of auxiliary booting software 164S in auxiliary booting software file 164 designated by file name 701 in auxiliary booting software information 162J is normal, booting unit 13 employs the auxiliary booting software 164S to boot.

The control apparatus 1 described above can be implemented by a computer with a nonvolatile storage device such as a disk drive, a semiconductor memory, or other recording device with some program files to implement the transmitting/receiving unit 11, the download unit 12 and the booting unit 13. The computer implements these units on it by loading those program files into main memory and controls its operation according to the read programs.

Next, operation of the embodiment will be described in detail.

Suppose that upgraded software booting flag 402 in upgraded software information 151J and upgraded software booting flag 602 in auxiliary upgraded software information 161J are OFF, and the file names of booting software file 154 and auxiliary booting software file 164 are set as file names 501 and 701 in booting software information 152J and auxiliary booting software information 162J, respectively. This condition means that the system is booted using booting software 154S on system power supply or reset.

Figure 8:
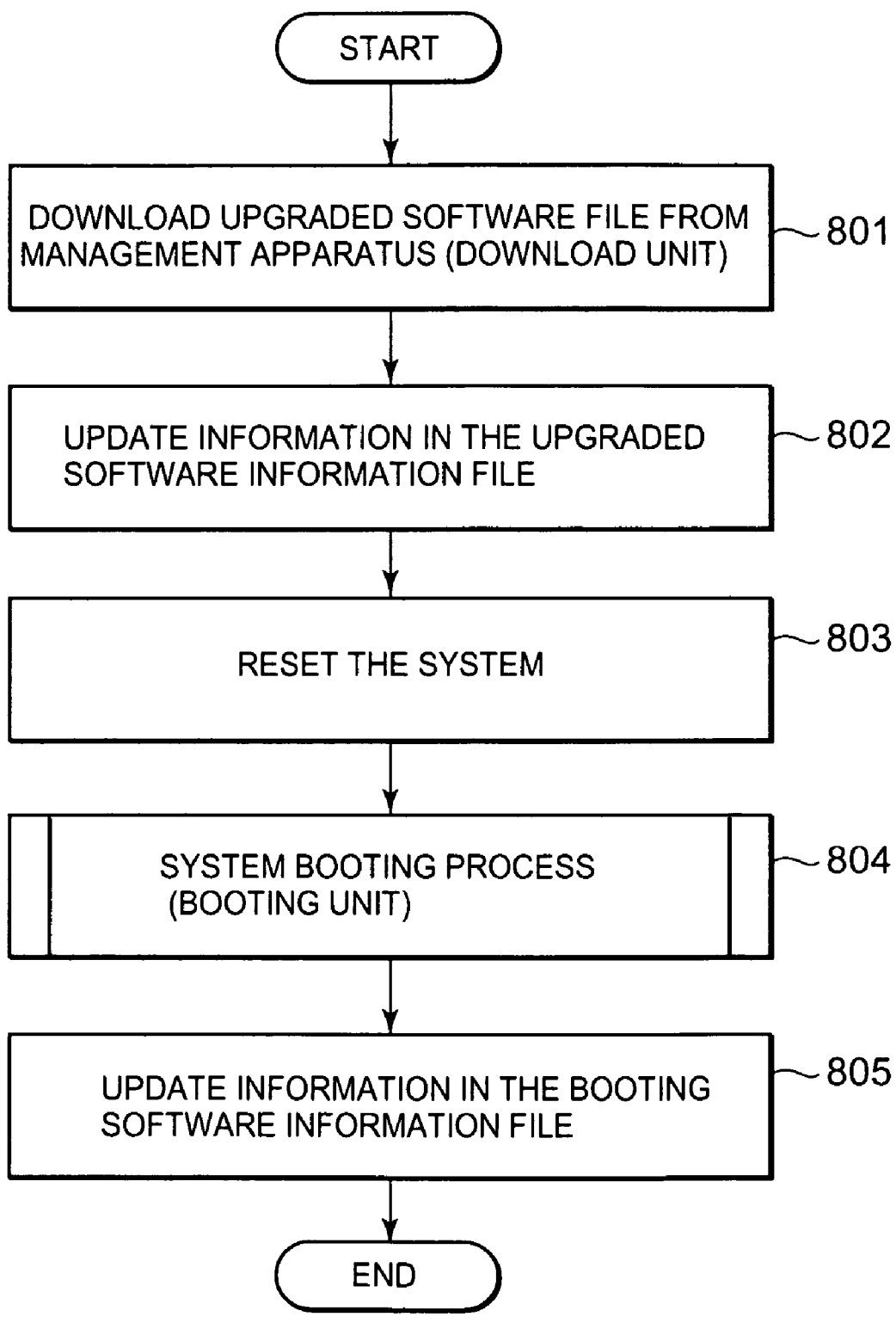
FIG. 8 is a flow chart which shows exemplary processes of control apparatus 1 for software upgrade.

In this condition, when booting software 154S is to be upgraded, download unit 12 in control apparatus 1 downloads upgraded software file 153 which contains latest version software (upgraded software 153S) from management apparatus 2 to put it into the first partition in nonvolatile storage 14, as shown in the flowchart of FIG. 8 (step 801). After downloading of upgraded software file 153 is completed, download unit 12 set the file name of downloaded upgraded software file 153 in file name 401 in upgraded software information 151J, and set the upgraded software booting flag 402 to ON (step 802). Then, the system is reset to upgrade the software (step 803).

After system reset, booting unit 13 of control apparatus 1 starts to select software to be used for system booting from upgraded software 153S on nonvolatile storage 14, booting software 154S, auxiliary upgraded software 163S, and auxiliary booting software 164S, according to the priority (a) to (d) as described above (step 804).

Figure 9:
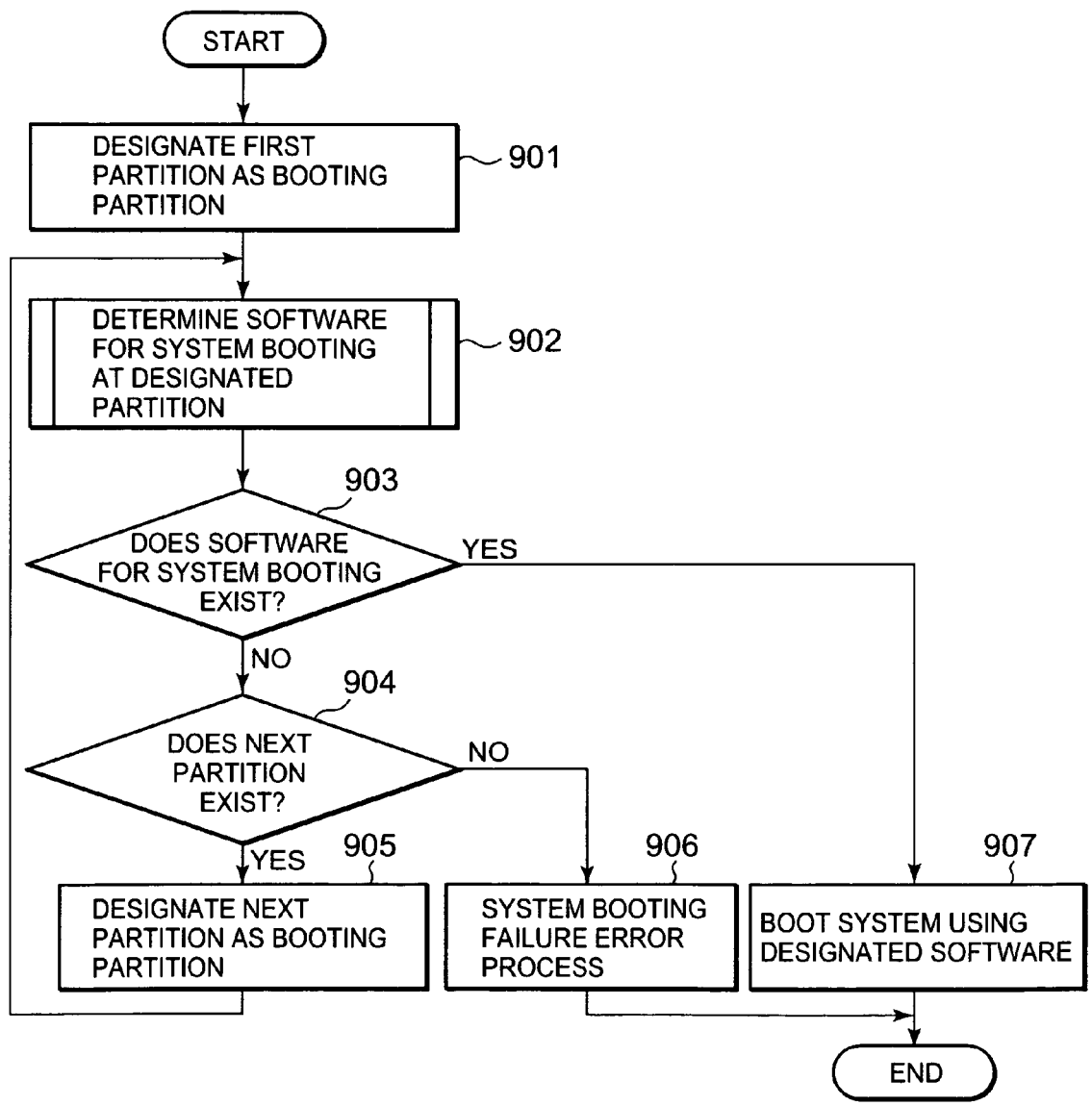
FIG. 9 is a flow chart which shows detailed processes of step 804 of FIG. 8.

FIG. 9 is a flow chart which shows an exemplary process of the system booting carried out in step 804 of FIG. 8. Referring to FIG. 9, booting unit 13 first designates first partition 15 as a partition to be used for system booting (step 901), then searches existing software that can be used for system booting in first partition 15 (step 902).

Figure 10:
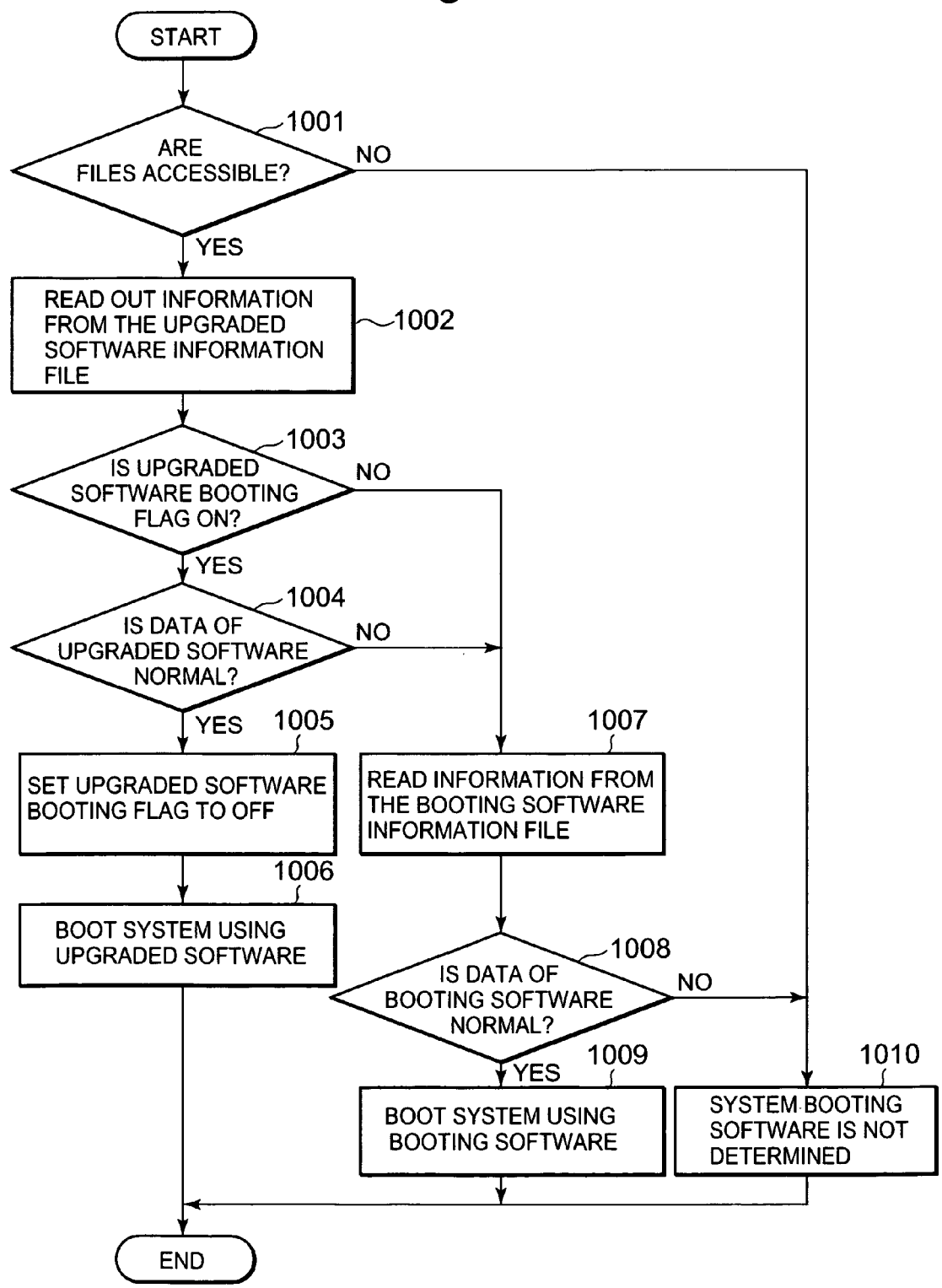
FIG. 10 is a flow chart which shows detailed processes of step 902 of FIG. 9.

FIG. 10 is a flow chart which shows an exemplary process of system booting software determination process carried out in step 902 of FIG. 9. Referring to FIG. 10, booting unit 13 confirms if the file in the designated partition (first partition 15) is currently accessible or not (step 1001). If accessible (Y in step 1001), booting unit 13 reads filename 401 of upgraded software file 153 just downloaded and upgraded software booting flag 402 from upgraded software information file 151 in the first partition (step 1002).

At this time, as upgraded software booting flag 402 is ON (Y in step 1003), booting unit 13 confirms if the data of upgraded software 153S stored in upgraded software file 153 designated by file name 401 is normal or not (step S1004). This confirmation is performed using checksum for example.

If the data of upgraded software 153S is normal (Y in step 1004), booting unit 13 turns OFF the upgraded software booting flag 402 and selects upgraded software 153S as software to be used for system booting (steps 1005, 1006).

Otherwise, in case that the data of upgraded software 153S is not normal (N in step 1004) or upgraded software booting flag 402 is OFF (N in step 1003), booting unit 13 reads the file name 501 of booting software file 154 from booting software information file 152 (step 1007) and checks if the data of booting software 154S stored in booting software file 154 designated by file name 501 is normal or not (step 1008).

In the case that the data of booting software 154S is normal (Y in step 1008), booting unit 13 selects booting software 154S as software to be used for system booting (step 1009). Otherwise, in case that the data of booting software 154S is not normal (N in step 1008) or files in first partition 15 are not accessible (N in step 1001), booting unit 13 fails to determine a booting software stored in the first partition 15. In this case, the system booting software is not determined (step 1010).

Referring again to FIG. 9, in the case that upgraded software 153S or booting software 154S is selected as the system booting software in step 1006 or 1009 in FIG. 10 (Y in step 903), booting unit 13 boots the system using the selected software (step 907). Otherwise, in the case that the system booting software is not determined in step 1010 in FIG. 10 (N in step 903), booting unit 13 checks if another partition exists or not (step 904). As the second partition exists in this embodiment (Y in step 904), booting unit 13 designates the second partition 16 (step 905), and executes the process of step 902 again. If no system booting software is found in all partitions (N in step 904), booting unit 13 executes an error process to indicate a system booting failure (step 906).

Referring again to FIG. 8, in the case that the software selected in step 804 exists in first partition 15, booting unit 13 updates the file name 501 in booting software information 152J with the file name of the file which stores the selected software. Otherwise, in the case that the software selected in step 804 exists in second partition 16, booting unit 13 updates the file name 701 in auxiliary booting software information 162J with the file name of the file which stores the selected software (step 805). For example, when the system is booted using upgraded software 153S stored in downloaded upgraded software file 153, booting unit 13 updates file name 501 of booting software information 152J with the file name of upgraded software file 153. After that, upgraded software 153S will be used as booting software on system power supply or reset.

In the description above, in step 801 of FIG. 8, upgraded software file 153 downloaded from management apparatus 2 is put into the first partition only, and in step 802, the file name of upgraded software file 153 is set in file name 401 in upgraded software information 151J only, and upgraded software booting flag 402 only is set to ON. With an alternative method, however, another redundant system can be provided. That is, in step 801, upgraded software file 153 can be put into first and second partitions 15 and 16, namely, can be put into 153 and 163, respectively. And in step 802, the file name of upgraded software file 153 can be set not only in file name 401 in upgraded software information 151J but also in file name 601 of auxiliary upgraded software information 161J. Further, not only upgraded software booting flag 402 but also that of 602 can be set to ON. In this alternative embodiment, booting unit 13 carries out processes shown in the flow charts of FIGS. 9 and 10 on system power supply or reset as well.

According to the above embodiment, the system can be booted always without delay regardless of whether the upgraded software 153S (new version software) downloaded is normal or not because the booting unit 13 starts the system using the upgraded software 153S if the data of the upgraded software 153S is normal on the first system reset after download of the upgraded software 153S, and otherwise starts the system using the booting software 154S in the case that the data of the upgraded software 153S is not normal. Therefore, according to the embodiment, such problems remained in the conventional art disclosed in the JP '703 can be avoided that it takes so long time for system booting so that operations using the control apparatus cannot be started in time, or interrupted for a long time.

Furthermore, according to the embodiment, the frequency of system booting failure can be remarkably reduced because the system includes not only first partition 15 which stores upgraded software 153S and booting software 154S, but also second partition 16 which stores auxiliary upgraded software 163S and auxiliary booting software 164S. That is, in the case that both of the booting software 153S and 154S stored in first partition 15 are not normal, the booting software 163S or 164S stored in second partition 16 can be employed to boot the system. On this basis, the frequency of system booting failure can be remarkably reduced.

The invention is applicable to every device having a nonvolatile storage which includes a file system and a function of operating software upgrade.

What is claimed is:

1. A control apparatus, comprising:
a single nonvolatile storage device having first and second partitions that both store booting software used for system booting and booting software information which designates the booting software;
a download unit that downloads an upgraded version of the booting software to store the upgraded version of the booting software in the first partition of the single nonvolatile storage device; and
a booting unit that boots the system;
wherein the booting unit is constructed so that on the first system reset, after download of the upgraded version of the booting software by the download unit, the booting unit checks the data of the upgraded version of the booting software stored in the first partition of the single nonvolatile storage device, and if the data of the upgraded version of the booting software is normal, then the booting unit boots the system using the upgraded version of the booting software, otherwise if the data of the upgraded version of the booting software is not normal, then the booting unit boots the system using the booting software designated by the booting software information.

2. The control apparatus according to claim 1, wherein:

the first partition of the single nonvolatile storage device stores an upgraded software booting flag;

the download unit being constructed to set the flag ON when the upgraded software is downloaded by the download unit;

the booting unit being constructed to boot the system using the upgraded version of the booting software if the upgraded software booting flag is ON and the data of the upgraded version of the booting software is normal, the booting unit then sets the upgraded software booting flag to OFF, and updates the booting software information to designate the upgraded version of the booting software in order to make the upgraded software function as booting software, otherwise if the upgraded software booting flag is OFF or the data of the upgraded version of the booting software is not normal, the booting unit boots the system using the booting software designated by booting software information.

3. A control apparatus, comprising:

a single nonvolatile storage device comprising a first partition and a second partition, the first partition stores system booting software used for system booting and booting software information designating the booting software, and the second partition stores auxiliary booting software used for system booting alternative to the system booting software;

a download unit that downloads an upgraded version of the booting software and stores the upgraded version of the booting software in the first partition; and a booting unit that boots the system;

wherein the booting unit is constructed so that on the first system reset after download of the upgraded version of the booting software by the download unit, the booting unit checks the data of the upgraded version of the booting software in the first partition, and if the data of the upgraded version of the booting software is normal, then the booting unit boots the system using the upgraded version of the booting software, otherwise if the data of the upgraded version of the booting software is not normal and the data of the booting software designated by the booting software information is normal, then the booting unit boots the system using the booting software, otherwise if the data of the upgraded version of the booting software is not normal and the data of the booting software designated by the booting software information is not normal and the data of the auxiliary booting software is normal, then the booting unit boots the system using the auxiliary booting software in the second partition.

4. The control apparatus according to claim 3, wherein the first partition stores an upgraded software booting flag;

the download unit being constructed to set the flag ON when the upgraded version of the booting software is downloaded by the download unit;

the booting unit being constructed to boot the system using the upgraded version of the booting software if the upgraded software booting flag is ON and the data of the upgraded version of the booting software is normal, the booting unit then sets the upgraded software booting flag to OFF, and updates the booting software information to designate the upgraded version of the booting software in order to make the upgraded software function as booting software, otherwise if the upgraded software booting flag is OFF or the data of the upgraded version of the booting software is not normal, and the data of the booting software is normal, the booting unit boots the system using the booting software designated by booting software information, otherwise the booting unit boots the system using the auxiliary software.

5. An upgrading method for a control apparatus comprising a nonvolatile storage that stores booting software used for system booting and booting software information which designates the booting software, the method comprising:

downloading an upgraded version of the booting software to store the upgraded version of the booting software in the nonvolatile storage;

resetting the system; and booting the system;

wherein on the first system reset after downloading, the data of the upgraded version of the booting software stored in the nonvolatile storage is checked, and if the data of the upgraded version of the booting software is normal, then booting the system is performed using the upgraded version of the booting software, otherwise if the data of the upgraded version of the booting software is not normal, then booting the system is performed using the booting software designated by the booting software information.

6. The upgrading method according to claim 5, wherein:

the nonvolatile storage stores an upgraded software booting flag;

the flag is set ON when the downloading is completed;

the system is booted using the upgraded version of the booting software if the upgraded software booting flag is ON and the data of the upgraded version of the booting software is normal, then the upgraded software booting flag is set to OFF, and the booting software information is updated to designate the upgraded version of the booting software in order to make the upgraded version of the booting software function as booting software, otherwise if the upgraded software booting flag is OFF or the data of the upgraded version of the booting software is not normal, the system is booted using the booting software designated by the booting software information.

7. An upgrading method for a control apparatus comprising a single nonvolatile storage device comprising a first partition and a second partition, the first partition stores system booting software used for system booting and booting software information designating the booting software, and the second partition stores auxiliary booting software used for system booting alternative to the system booting software, the method comprising the steps of:

downloading an upgraded version of the booting software to store the upgraded version of the booting software in the first partition;

resetting the system;

booting the system;

wherein on the first system reset after downloading, the data of the upgraded version of the booting software is checked, and if the data of the upgraded version of the booting software is normal then booting the system is performed using the upgraded version of the booting software, otherwise if the data of the upgraded version of the booting software is not normal and the data of the booting software designated by the booting software information is normal then booting the system is performed using the booting software, otherwise booting the system is performed using the auxiliary booting software.

8. The upgrading method according to claim 7, wherein the first partition stores an upgraded software booting flag; the flag is set ON when the downloading is completed;

the system is booted using the upgraded version of the booting software if the upgraded software booting flag is ON and the data of the upgraded version of the booting software is normal, then the upgraded software booting flag is set to OFF, and the booting software information is updated to designate the upgraded version of the booting software in order to make the upgraded version of the booting software function as booting software, otherwise if the upgraded software booting flag is OFF or the data of the upgraded version of the booting software is not normal, and the data of the booting software is normal, the system is booted using the booting software designated by booting software information, otherwise the system is booted using the auxiliary software.

9. A program product for a computer comprising a nonvolatile storage which stores booting software used for system booting and booting software information which designates the booting software, the program product causing the computer to function as:

a download unit that downloads an upgraded version of the booting software to store the upgraded version of the booting software in the nonvolatile storage; and a booting unit that boots the system;

wherein the booting unit is constructed so that on the first system reset after download of the upgraded version of the booting software by the download unit, the booting unit checks the data of the upgraded version of the booting software stored in the nonvolatile storage, and if the data of the upgraded version of the booting software is normal, then the booting unit boots the system using the upgraded version of the booting software, otherwise if the data of the upgraded version of the booting software is not normal, then the booting unit boots the system using the booting software designated by the booting software information.

10. The program product according to claim 9, wherein the nonvolatile storage stores an upgraded software booting flag;

the download unit being constructed to set the flag ON when the upgraded version of the booting software is downloaded by the download unit;

the booting unit being constructed to boot the system using the upgraded version of the booting software if the upgraded software booting flag is ON and the data of the upgraded version of the booting software is normal, the booting unit then sets the upgraded software booting flag to OFF, and updates the booting software information to designate the upgraded version of the booting software in order to make the upgraded software function as booting software, otherwise if the upgraded software booting flag is OFF or the data of the upgraded version of the booting software is not normal, the booting unit boots the system using the booting software designated by booting software information.

11. A program product for a computer which has a nonvolatile storage comprising a first partition and a second partition, the first partition stores system booting software used for system booting and booting software information designating the booting software, and the second partition storing auxiliary booting software used for system booting alternative to the system booting software, the program product causing the computer to function as:

a download unit that downloads an upgraded version of the booting software to store the upgraded version of the booting software in the first partition; and a booting unit that boots the system;

wherein the booting unit is constructed so that on the first system reset after download of the upgraded version of the booting software by the download unit, the booting unit checks the data of the upgraded version of the booting software, and if the data of the upgraded version of the booting software is normal, then the booting unit boots the system using the upgraded version of the booting software, otherwise if the data of the upgraded version of the booting software is not normal and the data of the booting software designated by the booting software information is normal, then the booting unit boots the system using the booting software, otherwise if the data of the upgraded version of the booting software is not normal and the data of the booting software designated by the booting software information is not normal and the data of the auxiliary booting software is normal, then the booting unit boots the system using the auxiliary booting software.

12. The program product according to claim 11, wherein the first partition stores an upgraded software booting flag; the download unit being constructed to set the flag ON when the upgraded version of the booting software is downloaded by the download unit;

the booting unit being constructed to boot the system using the upgraded version of the booting software if the upgraded software booting flag is ON and the data of the upgraded version of the booting software is normal, the booting unit then sets the upgraded software booting flag OFF, and updates the booting software information to designate the upgraded version of the booting software in order to make the upgraded software function as booting software, otherwise if the upgraded software booting flag is OFF or the data of the upgraded version of the booting software is not normal, and the data of the booting software is normal, the booting unit boots the system using the booting software designated by booting software information, otherwise the booting unit boots the system using the auxiliary software.

13. A storage medium having stored thereon instructions that can be read by a computer system, the computer system comprising a nonvolatile storage that stores booting software used for system booting and booting software information which designates the booting software, the instructions causing the computer system to perform the steps comprising:

downloading an upgraded version of the booting software to store the upgraded version of the booting software in the nonvolatile storage;

resetting the system; and
booting the system;
wherein on the first system reset after downloading, the data of the upgraded version of the booting software stored in the nonvolatile storage is checked, and if the data of the upgraded version of the booting software is normal, then booting the system is performed using the upgraded version of the booting software,
otherwise if the data of the upgraded version of the booting software is not normal, then booting the system is performed using the booting software designated by the booting software information.

14. A storage medium according to claim 13, wherein:
the nonvolatile storage stores an upgraded software booting flag;
the flag is set ON when the downloading is completed;
the system is booted using the upgraded version of the booting software if the upgraded software booting flag is ON and the data of the upgraded version of the booting software is normal, then the upgraded software booting flag is set to OFF, and the booting software information is updated to designate the upgraded version of the booting software in order to make the upgraded version of the booting software function as booting software,
otherwise if the upgraded software booting flag is OFF or the data of the upgraded version of the booting software is not normal, the system is booted using the booting software designated by booting software information.

15. A storage medium having stored thereon instructions that can be read by a computer system, the computer system comprising a nonvolatile storage comprising a first partition and a second partition, the first partition stores system booting software used for system booting and booting software information designating the booting software, and the second partition stores auxiliary booting software used for system booting alternative to the system booting software, the instructions causing the computer system to perform the steps comprising:

downloading an upgraded version of the booting software to store the upgraded version of the booting software in the first partition;
resetting the system;
booting the system;
wherein on the first system reset after downloading, the data of the upgraded version of the booting software is checked, and if the data of the upgraded version of the booting software is normal, then booting the system is performed using the upgraded version of the booting software,
otherwise if the data of the upgraded version of the booting software is not normal and the data of the booting software designated by the booting software information is normal then booting the system is performed using the booting software,
otherwise booting the system is performed using the auxiliary booting software.

16. A storage medium according to claim 15, wherein:
the first partition stores an upgraded software booting flag;
the flag is set ON when the downloading is completed;
the system is booted using the upgraded version of the booting software if the upgraded software booting flag is ON and the data of the upgraded version of the booting software is normal, then the upgraded software booting flag is set to OFF, and the booting software information is updated to designate the upgraded version of the booting software in order to make the upgraded version of the booting software function as booting software,
otherwise if the upgraded software booting flag is OFF or the data of the upgraded version of the booting software is not normal, and the data of the booting software is normal, the system is booted using the booting software designated by booting software information,
otherwise the system is booted using the auxiliary software.

* * * * *